(12) United States Patent
Garg et al.

(10) Patent No.: US 12,505,091 B2
(45) Date of Patent: Dec. 23, 2025

(54) INDEX-BASED MODIFICATION OF A QUERY

(71) Applicant: Oracle International Corporation, Redwood Shores, CA (US)

(72) Inventors: Anurag Garg, Cupertino, CA (US); Jack Randall Smiley, Flower Mound, TX (US)

(73) Assignee: Oracle International Corporation, Redwood Shores, CA (US)

( * ) Notice: Subject to any disclaimer, the term of this patent is extended or adjusted under 35 U.S.C. 154(b) by 13 days.

(21) Appl. No.: 17/960,365

(22) Filed: Oct. 5, 2022

(65) Prior Publication Data

US 2023/0222117 A1 Jul. 13, 2023

Related U.S. Application Data

(60) Provisional application No. 63/298,907, filed on Jan. 12, 2022.

(51) Int. Cl.
 *G06F 16/242* (2019.01)
 *G06F 16/22* (2019.01)

(52) U.S. Cl.
 CPC ........... *G06F 16/242* (2019.01); *G06F 16/22* (2019.01)

(58) Field of Classification Search
 None
 See application file for complete search history.

(56) References Cited

U.S. PATENT DOCUMENTS

| | | | | |
|---|---|---|---|---|
| 2006/0149724 | A1* | 7/2006 | Ritter | .................... G06F 16/217 |
| 2013/0346068 | A1* | 12/2013 | Solem | ................. G06F 16/5866 704/9 |
| 2015/0310073 | A1* | 10/2015 | Chakrabarti | ........ G06F 16/2465 707/722 |
| 2016/0063115 | A1* | 3/2016 | Ayan | .................... G06F 16/9535 707/722 |
| 2018/0349377 | A1* | 12/2018 | Verma | ................. G06F 16/2468 |
| 2020/0134070 | A1* | 4/2020 | Sidoti | ............... G06F 16/24542 |

* cited by examiner

*Primary Examiner* — Kannan Shanmugasundaram
(74) *Attorney, Agent, or Firm* — Invoke

(57) ABSTRACT

Techniques for modifying a query based on a data index of nodes in a data set are disclosed. A system modifies queries based on query terms associated with indexed data. The system modifies queries to include query terms based on indexed data or to obtain values for query terms that are not associated with indexed node properties. The system adds query terms, that reference indexed data, to a query in response to determining that none of a query's terms reference indexed data. The system derives values for query terms that are not associated with indexed node properties using a logical or mathematical formula. The system traverses parent nodes of a child node to identify values for query terms that are not associated with the child node in a data index, but are inherited from a parent node.

20 Claims, 7 Drawing Sheets

INDEX-BASED MODIFICATION OF A QUERY

INCORPORATION BY REFERENCE; DISCLAIMER

The following application is hereby incorporated by reference: application no. 63/298,907 filed on Jan. 12, 2022. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to an index-based modification of a query. In particular, the present disclosure relates to modifying queries to generate query responses associated with non-indexed query terms.

BACKGROUND

Organizations and enterprises generate large quantities of data that must be searchable to be useful to the organization. For example, a change in organization structure may result in varying zones of responsibility for employees that must be tracked for the organization to operate efficiently. A merger of two organizations may result in employee positions and entire cost centers being added, removed, or combined. A simple purchase transaction may include a receipt containing details about the products or services purchased, the store location, the buyer, payment terms, the transaction date, and so on. Sales transactions are booked in an organization's general ledger and posted to revenue accounts. Costs associated with creating and fulfilling purchases are recorded in expense accounts. Cost centers record expenses of companies and organizations within the company that support sales transactions. Every aspect of an organization or enterprise that describes and supports the functions of the enterprise generates data. Searching and analyzing the data—which is often in the terabytes—is vital to improve functioning of an enterprise.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
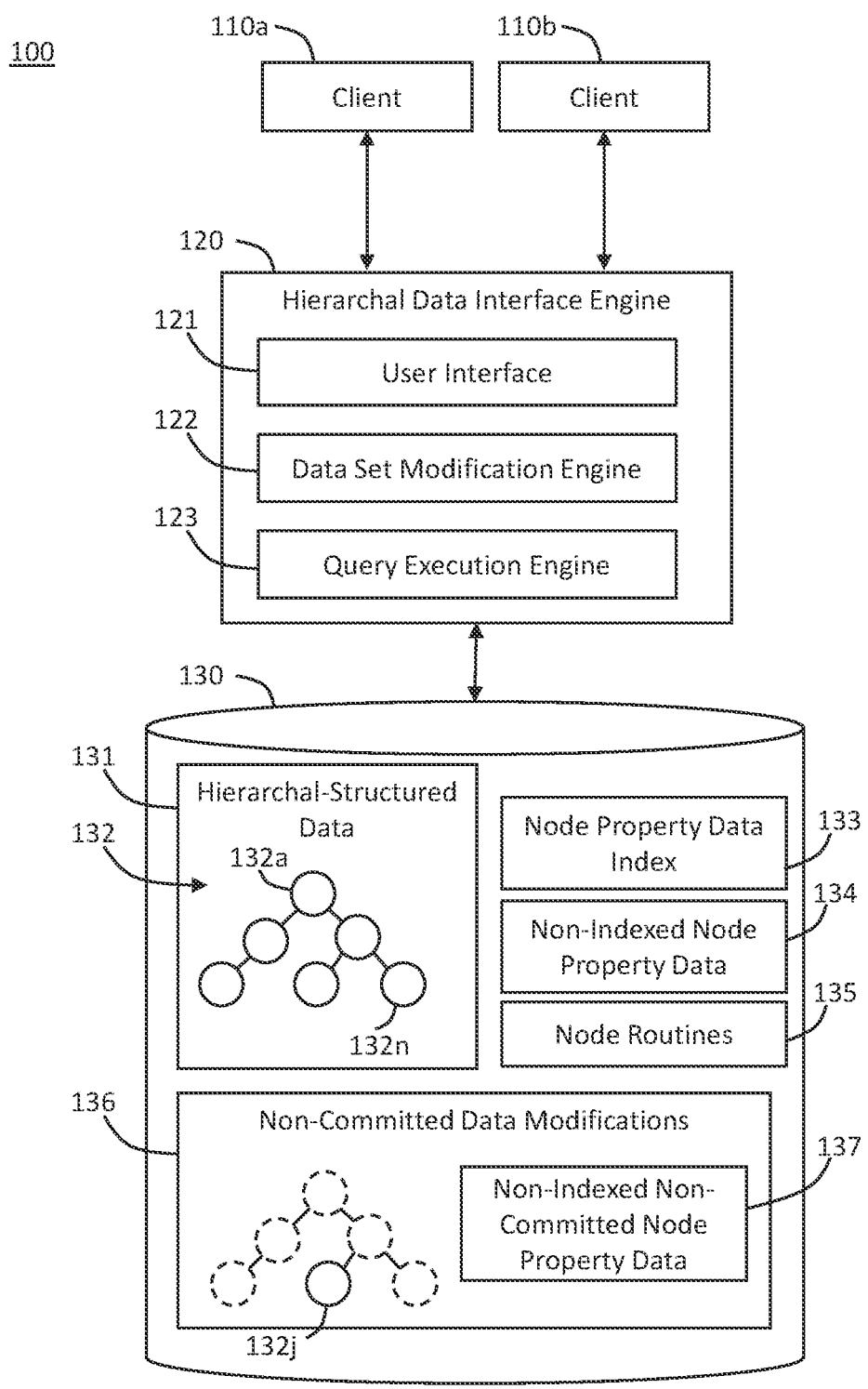
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. INDEX-BASED MODIFICATION TO DATA SET WITH HIERARCHAL DATA STRUCTURE
4. MACHINE-LEARNING BASED MODIFICATION OF QUERY
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

Query terms that reference indexed data help to quickly identify a subset of a database that is applicable to the query. Execution of queries with query terms that reference indexed data is typically less computationally expensive than execution, on the same database, of queries without query terms that reference indexed data. Queries may be executed on subset of hierarchal data sets. A hierarchal data set may be organized as a set of nodes in a tree. Queries executed against a subset of nodes (i.e., a portion of the tree) are typically less computationally expensive than execution of the queries on all the nodes (i.e., the entire tree).

Embodiments modify queries to generate query responses associated with non-indexed query terms based on other query terms which are associated with indexed data. The system modifies a query by adding an indexed node property to a query to generate a modified query. The execution of the modified query may be less computationally expensive than execution of the original query prior to modification. The original query may have required searching through data across all of the nodes in a hierarchy of nodes or all of the leaf nodes in the hierarchy of nodes. In contrast, the modified query, in accordance with embodiments, search through data across a subset of nodes that is identified in the index as being associated with the added, indexed node property.

One or more embodiments modify queries to include query terms based on indexed data. The inclusion of additional query terms, that reference indexed data, reduces the computational expense associated with execution of the query. The system may add query terms, that reference indexed data, in response to determining that none of a query's terms reference indexed data. Alternatively, or additionally, the system may add query terms, that reference indexed data, when the existing query terms, that reference indexed data, do not meet a certain criteria. For example, the system may add query terms, that reference indexed data, when the estimated execution time for a query exceeds a threshold value. The system may add query terms, that reference indexed data, when the system determines that the query fails a performance criterion.

For example, the system may apply a machine learning model to query terms to identify query terms, that reference indexed data, to add to a query. The system may request additional query terms, referencing indexed data, from a user. The system may present, within a user interface for user selection, a candidate set of query terms for adding to a query.

Embodiments modify queries to be executed on a hierarchal-structured data set including a set of nodes. Each of the set of nodes is associated with a set of node properties. Furthermore, direct, and indirect, child nodes of a particular node may inherit the properties of the particular node. Accordingly, identification of a node corresponding to a property results in identification of multiple nodes (the identified node's direct and indirect children) with the same property. In an example, a particular node may include a color property of "blue." All nodes that are direct or indirect children of the particular node, with the color property of "blue," may inherit the color property of "blue." An index of node properties identifies subsets of nodes associated with various node properties, referred to herein as indexed node properties. The subset of nodes may include all the direct and indirect children of a particular node that is explicitly identified by the index.

In an example, a query is to be executed in a hierarchal data set representing restaurants in the world. The leaf nodes represent specific restaurants while other higher-level nodes represent properties including Country, Vegetarian/Non-Vegetarian, and Zip Code. The system receives a query for Italian and California. The system determines that neither California nor Italian are indexed properties in the hierarchal data set. Identifying Italian restaurants in California would require searching through all leaf nodes (representing restaurants in the world) to determine whether the corresponding restaurant is located in California and is an Italian restaurant. Responsive to detecting a query without any indexed query terms, the system may add a zip code value 95113 (corresponding to a zip code in California) to the query based on (a) the query originating from a device in the zip code 95113 and (b) the zip code 95113 being indexed and identifying a particular node. Executing the query with the added-in indexed query term 95113, the system quickly identifies the particular node and searches through the subset of leaf nodes that are indirect or direct children of the particular node. The search for "Italian" restaurants on the subset of leaf nodes is quickly executed. Alternatively, the system may add the country "United States" to the query based on (a) California being located in the United States and (b) the country United States being indexed and identifying a corresponding node. Executing the query with the added-in indexed query term United States, the system quickly identifies the node corresponding to the United States. The system searches through the subset of leaf nodes that are indirect or direct children of the node corresponding to the United States. The search for "Italian" restaurants on the subset of leaf nodes is quickly executed.

In one or more embodiments, the system identifies a query term that is not indexed in association with a particular node, but which may be derived by a logical or mathematical formula. Each node in the hierarchal-structured data set may include a node routine document. The document may identify one or more routines the system may perform to obtain one or more values for non-indexed node properties that are not indexed in association with a particular node. Upon determining that a query associated with a particular node includes a term associated with a non-indexed node property, the system may analyze the node routine document to identify a mathematical or logical formula for deriving the non-indexed node property. For example, an employee-type node may have a node property "manager." In addition, the node may lack a node property "office." In other words, the node property "office" is associated with the employee-type node in a data index. The system may identify a node routine document for the employee-type node that provides a logical formula that if an employee has a particular manager (e.g., "George B."), then the employee works in a particular office, (e.g., "Portland"). According to another example, a product-type node may have an indexed node property "cost" that represents a cost in a particular currency to manufacture the product. The Product-type node may not have a field for "price" indicating a price of the product in a particular region. In other words, the node property "price" is not indexed to the node-type "Product." If the system receives a query including a term for a particular and a term for "price," the system may analyze a node routine document associated with the Product-type node to identify a mathematical formula for converting an indexed node property (e.g., "cost") to obtain the non-indexed node property "price." For example, the node routine document may include a mathematical formula to convert a value for "cost" to another currency associated with a country in which the product is to be sold, adding pre-defined shipping costs, and adding a pre-defined mark-up. The system obtains the "price" node property by applying the mathematical formula to a value for the indexed node property "cost."

In one or more embodiments, the system identifies a query term that is not indexed in association with a particular node, but which may be inherited from a parent node of the particular node. For example, an employee-type child node may not include a node property, "cost center." In other words, the node property "cost center" is not associated with employee-type nodes in a data index. However, a Vice-President-type node, which is a parent node to the employee-type node, may include a node property "cost center." One Vice-President-type node may include a value "Marketing" for a "cost-center" type node. Another may include a value "Human Resources." Upon receiving a query including terms associated with an employee-type node and a "cost center" node property (e.g., "employees in the Marketing department"), the system may analyze a node routine document associated with the employee-type node. The node routine document may direct the system to query a parent node of the employee-type node. The node routine document for the parent node may further direct the system to query an additional parent node until the system queries the parent node of the type "Vice-President," which includes the node property "cost center." In addition, or in the alternative, the node routine document may direct the system to query one or more Vice-President-type nodes to obtain a value for the node property "cost center" that may be inherited by the employee-type node.

In one or more embodiments, the system identifies a query term that is not indexed in association with a particular node, but which may be obtained within a complex node property of the node. For example, a node property for "Address:" may include a street number, street name, city, and state. A query term for a "street name" is not indexed in association with the node. The system may analyze a node routine document associated with the node to identify sub-properties of the node (such as "street name," "city") that are not expressly indexed as properties of the node, but which are included within a complex node property of the node. The system may return the sub-property of the node associated with the query term without returning other sub-properties of the complex node property. Alternatively, the system may return as a query result the entire value for the node property "Address:".

In one embodiment, the system identifies a query term associated with a proposed, but non-committed, modification to the hierarchal-structured data set. For example, a user may submit a request to the system to modify a node property "location" for an employee-type node. The request may be pending and not-executed when the system receives a query including terms associated with the employee-type node and the node property "location." The system may analyze a node routine document associated with the employee-type node to identify any changes to the node that are proposed, but not yet executed in the data set. The system may further determine from the node routine document which users may have access to the proposed, but not yet executed, modified node property values. Based on determining that a user submitting a query has access to a proposed, but not yet executed, modification to a node property value, the system may provide the proposed, but not yet executed, modification to the node property value as a query result. According to one example, the system provides the proposed, but not yet executed, modification to the node property value as a query result together with a current, an unmodified, node property value.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes clients 110a, 110b that communicate with a hierarchal data interface engine 120 to access and modify data in a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Examples of clients 110a and 110b include computing devices and networks of computing devices. For example, an enterprise, such as a company, may include multiple organizations that access the hierarchal data interface engine 120. In addition, an organization may include multiple users that access the hierarchal data interface engine 120 via personal computing devices, such as desktop computers or mobile computing devices.

In one embodiment, data, accessible by the hierarchal data interface engine 120, is stored in the data repository 130 as a hierarchal data structure 131. The hierarchal data structure 131 includes a plurality of nodes 132. Each node is a data structure of a particular type representing a particular entity. Examples of entities include "employee," "customer," "account," "cost center," and "city." An example of a hierarchy includes a "product line" type parent node, two "product"-type child nodes, a separate "product development team" and "sales team"-type child node for each "product"-type node, and "employee"-type nodes for each "product development team" and "sales team"-type node. Each node is defined by a set of node properties. For example, an "employee" type node may include node properties: "employee name," "employee class," "employee title," "salary," "residence," "contact information," "supervisor," and "department." As another example, a node-type "product" may include node properties: "product name," "product type," "manufacturing group," "marketing group," and "development group." Different node types typically include different sets of respective node properties. Some node properties may overlap among multiple different node types. Other node properties of one node type may be non-overlapping with node properties of one or more other node types.

The hierarchal data interface engine 120 generates a node property data index 133 that describes relationships among node properties and nodes. The node property data index 133 may include one or more tables, for example. One table may represent one node type and the node properties associated with the node type. The hierarchal-structured data 131 also includes non-indexed node property data 134 (illustrated separately from the hierarchal-structured data 131 for purposes of description). Non-indexed node property data 134 includes node properties that are not indexed to a particular node. For example, a node-type "account" may be indexed to properties "Name," "Rep," "Products," and "location." The node-type "account" may not be indexed to node properties "cost center," "manager," "product lead," or "salary." A non-indexed node property may be indexed to a different node type. For example, while the node property "salary" is not indexed to the node-type "account," it is indexed to the node type "employee." Alternatively, a non-indexed node property may be indexed to no node type. For example, a node property "cost in Japanese Yen" may not be indexed to any node in the hierarchal-structured data set 131.

The query execution engine 123 may identify a value for a non-indexed node property by deriving the value from a value for an indexed-node property. Derived node property data may be data that is not stored in a field associated with the node, such as a set of fields describing the node properties of the node, but that may be obtained by applying a mathematical or logical formula to a value in the set of fields describing the node properties. For example, an employee-type node may have a node property "manager." In addition, the node may lack a node property "office." A node routine 135 may exist providing a logical formula that if an employee has a manager "Cody A.," then the employee works in the office "Los Angeles." The node property "office" is a non-indexed node property—not indexed to the node-type "employee"—that is derived by applying a logical formula to a value for the indexed node property "manager." According to another example, a product-type node may have an indexed node property "cost" that represents a cost in a particular currency to manufacture the product. The "product"-type node may not have a field for "price" indicating a price of the product in a particular region. However, a node routine 135 may exist providing a mathematical formula for converting the "cost" to another currency associated with a country in which the product is to be sold, adding pre-defined shipping costs, and adding a pre-defined mark-up. The node property "price" is a non-indexed node property that is obtained by applying a mathematical formula to a value for the indexed node property "cost." Upon receiving a query including a query terms associated with node properties "product" and "price," the query execution engine 123 may: (a) identify a node routine 135 associated with the node-type "product," (b) identify a mathematical formula in the node routine 135 to obtain a value for a non-indexed node property "price" using a value for an indexed node property "cost," and (c) execute the mathematical formula to return a value for the non-indexed node property "price" for one or more products.

Another type of non-indexed node property may be an inherited node property that a child node may inherit from a parent node in the hierarchal-structured data 131. For example, a query may include terms specifying an Employee-type node and a value associated with a Division-type node property, indicating a division in an organization to which an employee belongs. However, the Employee-type node may not include Division-type node property. Accordingly, the node property "Division" is not included in the node property data index 133 associated with the node type "Employee." The system may analyze a node routine 135 associated with the Employee-type nodes to determine that a node routine 135 exists which indicates "Division" is a node property of a parent node of a type "VP," which is a parent of the Employee-type node.

According to one embodiment, the node routine 135 identifies the type of node (e.g., "VP") from which the query execution engine 123 may obtain an inherited node property value. Upon executing an initial query to identify an initial subset of Employee-type nodes, the query execution engine 123 may traverse a subset of "VP"-type parent nodes associated with the subset of Employee-type nodes to identify one or more parent nodes having a query-specified value for the Division-type node property. The query execution engine 123 returns query results of Employee type nodes which include (a) Employee-type nodes, which (b) are child nodes of a parent node having the query-specified Division-type node property value. According to another embodiment, the node routine 135 indicates only that the non-indexed property value may be inherited, without indicating the particular node type from which the property value is inherited. The query execution engine 123 may traverse each parent node associated with the particular Employee-type node to identify one or more parent nodes having a query-specified value for a Division-type node property.

The data repository may store non-committed data modifications 136 to the hierarchal-structure data 131. A non-committed data modification 136 a modification proposed by a client 110a or 110b to change a node property of a node 132j, such as changing a value, adding a node, removing a node, and changing a location of a node within the node hierarchy. The proposed modifications to the hierarchal-structured data are not indexed in the node property data index 133. When a client 110a or 110b proposes a modification to the hierarchal-structured data 131, the data set modification engine 122 may store the non-indexed non-committed node property data 137. The data set modification engine 122 may also create a node routine 135 pointing to the non-indexed non-committed node property data 137. When a query includes indexed node property data, the query execution engine 123 may execute a node routine 135 to return, in addition or in the alternative to the indexed node property data, the non-indexed non-committed node property data 137.

The hierarchal data interface engine 120 includes a user interface 121 that renders displays for allowing the clients 110a and 110b to access and modify the data in the data repository 130. For example, the user interface may render a page that allows a user to select: (a) from among a plurality of views for viewing the data in the data repository 130, where each view presents different sets of data or displays the data in a different way, (b) requests for modifying data in the data repository 130, (c) applications accessing the data in the data repository 130, (d) node types, hierarchy sets, and node sets of nodes, or data structures, in the data repository 130, and (e) reports and audits associated with data in the data repository 130.

The data set modification engine 122 allows a user to modify data in the data repository 130. For example, the hierarchal data interface engine 120 may receive an input via the user interface 121 to (a) add or remove a node property to a particular node type, (b) modify a value of node property of particular node stored in the data repository 130, (c) change the hierarchal structure of the data set by adding or removing nodes or changing node dependencies. In one embodiment, any changes to the hierarchal-structured data 131 are generated as proposed changes that are implemented subject to approval by a user having a requisite authority. In addition, or in the alternative, proposed changes may be implemented after a predetermined period of time or at pre-defined times.

The query execution engine 123 receives queries to the hierarchal-structured data 131 and executes the queries to return queried data including content stored in the nodes 132 of the hierarchal-structured data 131. The query execution engine 123 accesses the node property data index 133 to identify indexed node properties of nodes 132 in the hierarchal-structured data 131. The query execution engine 123 accesses node routines 135 associated with the nodes 132 to identify non-indexed data associated with the nodes. According to one type of node routine 135, the query execution engine 123 derives non-indexed node property values for a node by applying a mathematical or logical formula to an indexed node property value. According to another type of node routine 135, the query execution engine 123 identifies an inherited node property value for a child node. The inherited node property value is a value that is not associated with an indexed node property for the child node, but is indexed to a parent node of the child node and is inherited by the child node. According to yet another type of node routine 135, the query execution engine 123 identifies a non-committed and non-indexed data modification associated with an indexed node property value. The query execution engine 123 accesses a non-indexed and non-committed node property value corresponding to the query.

Additional embodiments and/or examples relating to computer networks are described below in Section 5, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the hierarchal data interface engine 120. Alternatively, or additionally, a data repository 130 may be implemented or executed on a computing system separate from the hierarchal data interface engine 120. A data repository 130 may be communicatively coupled to the hierarchal data interface engine 120 via a direct connection or via a network.

Information describing the hierarchal-structured data 131 may be implemented across any of components within the system 100. However, this information is illustrated within the data repository 130 for purposes of clarity and explanation.

In one or more embodiments, the hierarchal data interface engine 120 refers to hardware and/or software configured to perform operations described herein for making index-based modifications to queries. Examples of operations for making index-based modifications to queries are described below with reference to FIG. 2.

In an embodiment, the hierarchal data interface engine 120 is implemented on one or more digital devices. The term "digital device" refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 121 refers to hardware and/or software configured to facilitate communications between a user and the hierarchal data interface engine 120. Interface 121 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 121 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 121 is specified in one or more other languages, such as Java, C, or C++.

In one or more embodiments, the clients 110a and 110b may be tenants of the same set of computing resources. A tenant is a corporation, organization, enterprise, or other entity that accesses a shared computing resource, such as application the hierarchal data interface engine 120 and the data repository 130. In an embodiment, clients 110a and 110b are tenants that are independent from each other. A business or operation of client 110a is separate from a business or operation of tenant client 110b.

While FIG. 1 illustrates an embodiment in which a system identifies indexed node property data associated with nodes in a hierarchal data structure, embodiments include data sets that are not necessarily organized in a hierarchal node structure. For example, a database may store data in one or more tables or data objects. Each table or data object may include a plurality of fields storing values associated with attributes. The attributes may correspond to characteristics associated with the table. For example, a table may be associated with an entity, and table attributes may correspond to values associated with the entity. An index may store data associated with the one or more tables, including particular sets of attributes which are associated with respective tables in the database.

3. Index-Based Modification to Data Set with Hierarchal Data Structure

Figure 2:
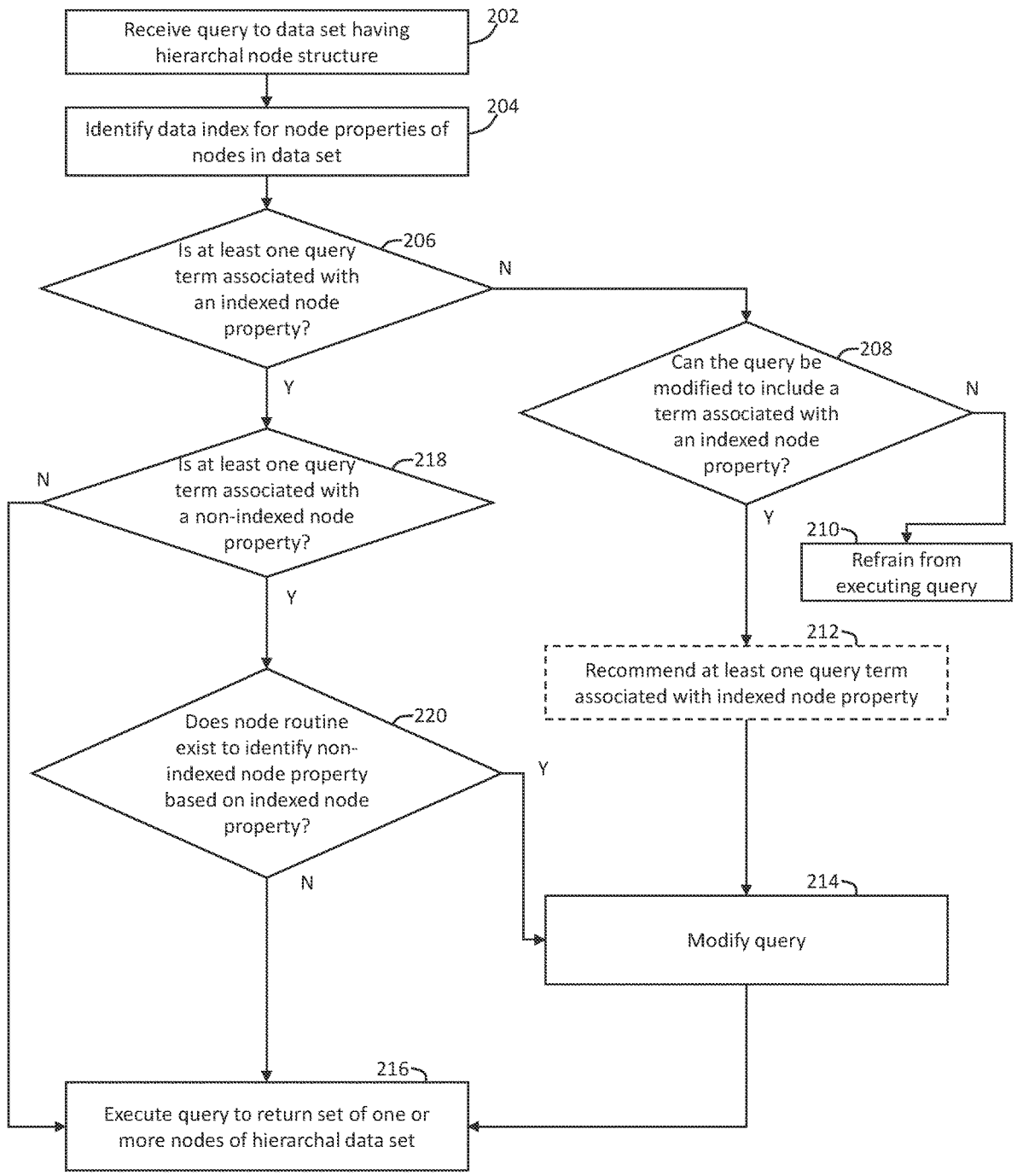
FIG. 2 illustrates an example set of operations for modifying a query in accordance with one or more embodiments.

FIG. 2 illustrates an example set of operations for modifying a query using a data index of node properties in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system receives a query to a data set having a hierarchal node structure (Operation 202). In particular, the data set is organized as a hierarchy of nodes, each node associated with an entity. Each node specifies a set of node properties associated with the node. Examples of entities include "employee," "customer," "account," "cost center," and "city." An example of a hierarchy includes a "product line" type parent node, two "product"-type child nodes, a separate "product development team" and "sales team"-type child node for each "product"-type node, and "employee"-type nodes for each "product development team" and "sales team"-type node. Examples of node properties associated with an "employee" type node may include: "employee name," "employee class," "employee title," "salary," "residence," "contact information," "supervisor," and "department." As another example, a node-type "product" may include node properties: "product name," "product type," "manufacturing group," "marketing group," and "development group."

The system identifies a data index associated with the nodes in the data set (Operation 204). The data index identifies node properties associated with different nodes. The data index also identifies different nodes associated with different node properties. The data index may further specify relationships among different nodes. The data index may include one or more tables, for example. Each table of the node index may represent a respective node type and the node properties associated with the respective node type. For example, a table in the data index associated with a node type "employee" may specify the node properties (e.g., "name," "salary," "department," etc.) associated with the node type. Another table in the data index may include node properties associated with a node type "product" or a node type "cost center."

The system determines if at least one query term in the query is associated with an indexed node property found in the data index (Operation 206). For example, the system may determine whether any query term is associated with a node-type included in the data index. Examples of node types include "employee," "city," "account," and "cost center." A node type may specify any entity for which data is stored in the hierarchal-structured data set. As an example, a query may include the terms: "list of all employees in the Chicago office." The system may parse the query to identify "list" as a command-type term requesting data, "employee" as an indexed node property, and "office" as a node property that is not an indexed node property associated with the node type "employee."

If the system determines that no query term in the query is associated with an indexed node property found in the data index, the system determines whether the query may be modified to include a term associated with an indexed property node (Operation 208). In one embodiment, the system refers to one or more stored tables or lists indicating similar or related query terms. In one embodiment, the system applies a machine learning model to the query terms to determine whether related query terms exist that correspond to indexed node properties. For example, a query term "expense" may not be found in an index, but a node property "cost" may be an indexed node property. Based on determining that the data values associated with the indexed term "cost" correspond to values associated with the non-indexed term "expense," the system may replace the term "expense" with a query term "cost." Substitute terms may be identified by reference to a table of substitute terms for node properties, or by machine learning. For example, a machine learning model may learn based on training data sets of historical query search terms when one term, corresponding to an indexed node property, may be substituted for another term, corresponding to an un-indexed node property.

If the system determines that the query cannot be modified to include a term associated with an indexed node property, the system refrains from executing the query (Operation 210). For example, the system may determine that a query including the term "birds" is not sufficiently related to any indexed query properties to provide any recommendation for modifying the query. The system may generate a notification to a sender of the query that the query cannot be executed based on the terms provided.

If the system determines that the query can be modified to include a term associated with an indexed node property, the system modifies the query (Operation 214). For example, the system may modify the query to include an indexed query term identified by a machine learning model or one or more tables specifying indexed node properties and related, non-indexed terms.

In one or more embodiments, the system may generate a recommendation for at least one query term associated with an indexed node property (Operation 212). For example, the system may determine by a machine learning algorithm or table identifying related terms that a query including the non-indexed term "manager" could be modified to include the indexed term "supervisor" based on a semantic similarity between the terms "manager" and "supervisor." The system may generate a visual recommendation via a user interface to provide a user with options for selecting one or more query terms associated with indexed node properties. For example, in response to a query including a non-indexed term "in-charge," the system may recommend modifying the query to include one or more indexed terms: "supervisor," "manager," "lead," and "responsible party." Based on detecting a user selection of one or more query terms associated with indexed node properties, the system may modify the query to include the selected query terms (Operation 214).

If the system determines in Operation 206 that at least one query term is associated with an indexed node property, the system further determines if at least one query term is associated with a non-indexed node property (Operation 218). For example, a query may include an indexed query term "account," associated with a node name, and a non-indexed query term "price." If each query term is associated with an indexed node property, the system proceeds to execute the query (Operation 216). However, if the system determines in Operation 218 that at least one query term is associated with a non-indexed node property, the system further determines whether a node routine exists to identify the non-indexed node using one or more indexed node properties associated with query terms in the query (Operation 220). The system may identify, for a particular node associated with a particular indexed node property, a particular node routine document. The node routine document for the particular node specifies one or more routines or processes for identifying or obtaining non-indexed node properties associated with the node. The routines or processes may include (a) executing a mathematical or logical formula, (b) traversing a particular sub-set of nodes, and (c) executing a query to a particular node.

Referring to the above example in which a query includes the terms: "list of all employees in the Chicago office," the system identifies the term "employee" as an indexed node property, the term "office" as a node property that is not an indexed node property associated with the node type "employee," and the term "Chicago" as a value associated with the non-indexed node property. The system analyzes a node routine associated with a node type "employee" to determine whether a routine exists by which the system may calculate, infer, or otherwise obtain a value for the non-indexed node property "office" associated with the indexed node property "employee."

If the system determines that a node routine exists to identify a non-indexed node property associated with a query term, the system modifies the query 214 using the node routine (Operation 214). According to one type of node routine, the system applies a mathematical or logical formula to an indexed node property value to obtain a non-indexed node property value. The indexed node property value is associated with a query term in the query. According to another type of node routine, the system identifies a node property of a parent node type as a non-indexed node property for a queried child node. The system may traverse parent nodes of the child node to identify a value for the inherited, non-indexed node property. According to yet another type of a node routine, the system identifies a non-committed and non-indexed data modification associated with an indexed node property value. The system accesses a non-indexed and non-committed node property value corresponding to the query.

Referring to the above example in which a query includes the terms: "list of all employees in the Chicago office," the system may identify a routine in the node routine document associated with the node type "employee" specifying "office" as a node property that the employee-type node inherits from a parent node.

Figure 3:
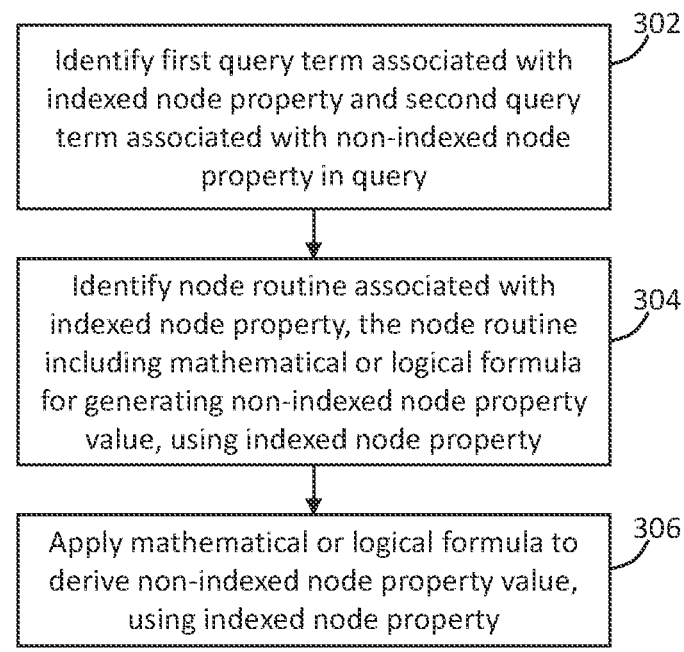
FIGS. 3-5 illustrate example operations for modifying a query to obtain a value for a non-indexed node property according to embodiments.

FIG. 3 illustrates an example set of operations for deriving non-indexed node properties from indexed node properties by applying a mathematical or logical formula to an indexed node property value to obtain a non-indexed node property value in accordance with one or more embodiments. As illustrated in FIG. 3, the system identifies, in a query, a first query term associated with an indexed node property and a second query term associated with a non-indexed node property (Operation 302).

The system identifies a node routine associated with the indexed node property (Operation 304). The node routine includes a mathematical or logical formula for deriving a value for the non-indexed node property using a value for an indexed node property. The node routine may be stored in data storage together with the node. Alternatively, the node may include a pointer, uniform resource locator (URL), or other reference to a location of the node routine. According to yet another alternative embodiment, a node tree may include a node routine table or document that stores node routines for a plurality of nodes in the particular node tree. The system may refer to the document storing the node routines for the plurality of nodes in the node tree to identify node routines for a particular node. A mathematical or logical formula may receive as an input variable an indexed node property value. The mathematical or logical formula may generate, as an output value, a query response value derived from the indexed node property value.

Applying a mathematical formula to an indexed node property to obtain a value for a non-indexed node property includes, for example, performing a conversion from one unit of measurement to another. For example, an indexed node property may describe a price to sell a product (e.g., node property "price"). A query may include terms indicating a cost to produce the product (e.g., "how much does it cost to make Product A") The node routine may include a mathematical formula that takes the value for the sale price of the product and reduces the value by a markup amount to generate a cost to make the product. As another example, a query request information regarding a number of employees in a division of a company. A "division"-type node may not have an indexed property indicating a number of employees. However, a node routine may include a mathematical formula directing the system to count each "employee"-type node that is a child node of the "division"-type node to calculate the number of employees in the division.

The system applies the mathematical or logical formula specified for the indexed node property to derive the value for the non-indexed node property (Operation 306). The system returns the derived value for the non-indexed node property as a query result. By accessing a node routine to perform mathematical or logical formulae to indexed node property values, the system is able to return query responses associated with non-indexed node properties without generating errors or exceptions. In addition, the system is able to provide increased query response functionality without generating separate fields and node properties for every variation of node property values.

Figure 4:
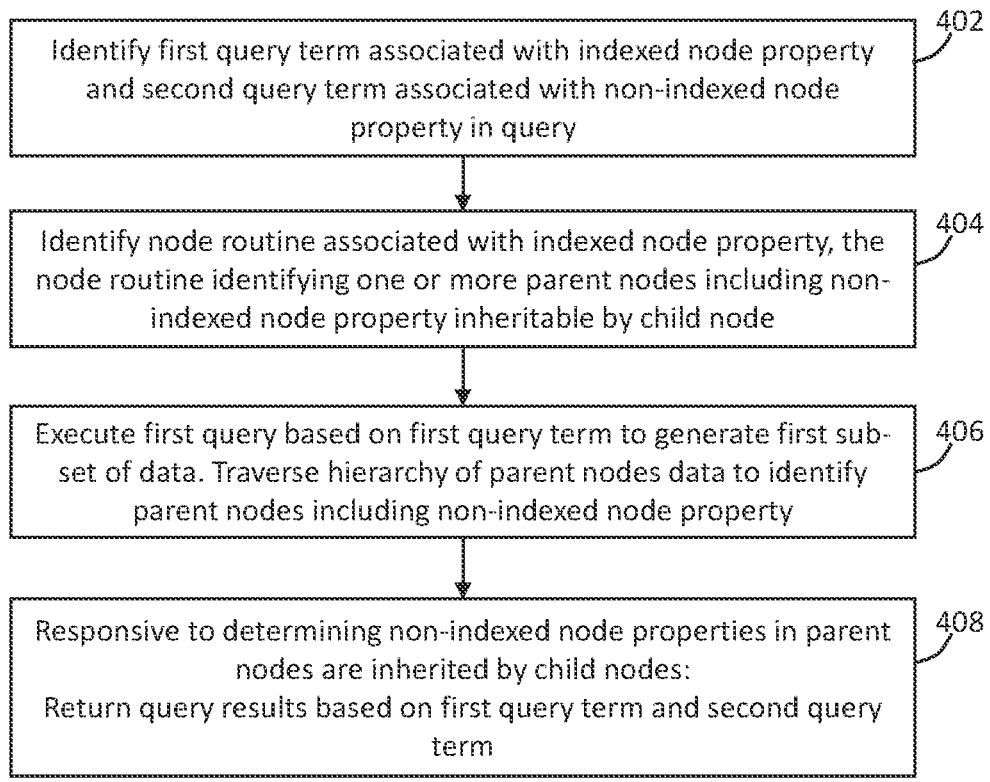

FIG. 4 illustrates an example set of operations for deriving non-indexed node properties from indexed node properties by identifying inherited node properties, according to an embodiment. As illustrated in FIG. 4, the system identifies, in a query, a first query term associated with an indexed node property and a second query term associated with a non-indexed node property (Operation 402). For example, an indexed query term may correspond to a name of a node (e.g., "Team 1" of node type "Team", "Accounting" of node type "Cost Center", "Product 1" of a node type "Product," etc.). A non-indexed query term may correspond to node property that is not among a set of node properties associated with the node. For example, if a query term "Team 1" is an indexed node property (e.g., a value for an indexed node property "node name"), a query term "city:New Orleans" may be a non-indexed query term, since there may be no "city"-type node property in a "team"-type node.

The system identifies a node routine associated with the indexed node property (Operation 404). The node routine specifies a set of one or more parent nodes associated with the indexed node property. Alternatively, the node routine may indicate that the non-indexed node property is an inherited property without indicating a particular set of one or more parent nodes. The one or more parent nodes include node properties, not included in a data index associated with the child nodes, which are inherited by the child node. An inherited property is a node property of a parent node that may be applied to child nodes of the parent node. For example, a node "HR" may have a node property "Los Angeles" that would apply to every "Employee"-type node that is a child node of "HR." However, other node properties of the node "HR" may not apply to child nodes. For example, the node "HR" may have a node property "Budget." The node property "Budget" would not be a node property that would be inherited by child nodes of the node "HR." Accordingly, a node routine associated with an "employee"-type child node may specify "location" as an inherited node property from the "cost-center"-type node (e.g., named "H.R.", for example). The node routine may not specify "Budget" as an inherited node property.

The system performs a first query based on the query term associated with the indexed node property to identify a first set of child nodes (Operation 406). For example, if a query includes a query term "Team 1" the system performs a query to identify a node of the node type "Team" and a value (or name) "Team 1." Alternatively, the query may include a term "team" and the system may perform a query to identify each node of the type "Team." Based on identifying the non-indexed node property as an inherited property (e.g., a node property inherited by a child node returned by the first query from a parent node), the system traverses the parent nodes of any child nodes returned by the first query to identify one or more parent nodes that include the non-indexed node property. For example, if a query including the indexed node property "team" (e.g., specifying the name of a node type "team") returns ten nodes, named: "Team 1" through "Team 10," then the system traverses parent nodes for the ten nodes Team 1 through Team 10 to identify any parent nodes that include values for a non-indexed node property included in the query. For example, according to one hierarchal node structure, a parent node type "Product" includes as child nodes sales teams that sell the product. The Team-type child nodes may not include a node property "product type." However, the Product-type parent node may include the node property "product type." The node property "product type" may be inherited by the Team-type child nodes from the Product-type parent nodes.

The system returns as query results one or more values associated with the node properties of the parent nodes that are not included in the data index associated with the one or more child nodes (Operation 408). The system may return query results without requiring intervening user input directing the system to analyze parent nodes. In other words, from a user perspective, the user enters query terms and obtains query results. The system performs the first query and traversal of parent nodes without requiring user input to initiate traversing the parent nodes, and without generating a notification that a query term may not be an indexed node property. By accessing a node routine to identify inherited node properties that are not indexed in a particular node associated with an indexed query term, the system is able to return query responses without generating errors or exceptions. The system is able to generate query responses to queries that include indexed node values for a particular child node and non-indexed node values for the child node, which are values inherited from a parent node. In addition, the system is able to provide increased query response functionality without generating separate fields and node properties for every inherited node property in every child node of a hierarchal node structured data set.

Figure 5:
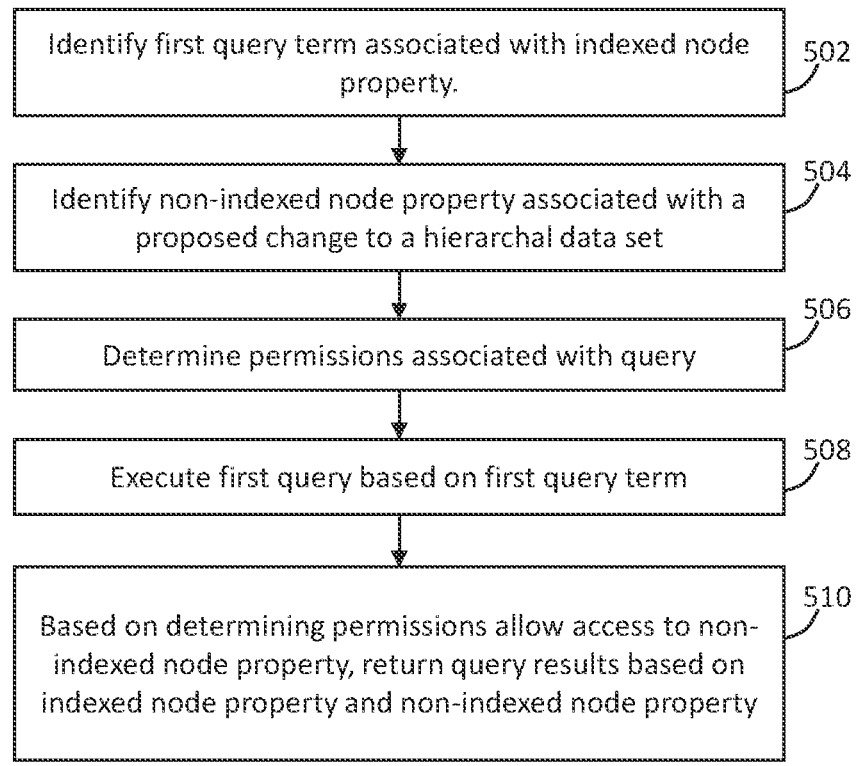

FIG. 5 illustrates an example set of operations for deriving non-indexed node properties from indexed node properties by identifying proposed, but uncommitted changes to a node hierarchy, according to an embodiment. As illustrated in FIG. 5, the system identifies a query term associated with an indexed node property for one or more nodes of a data set (Operation 502).

The system identifies a node routine associated with the indexed node property. The node routine may identify one or more proposed, but uncommitted and non-indexed, changes to values associated with the indexed node property (Operation 504). Alternatively, the node routine may direct the system to a location where proposed, but uncommitted, and non-indexed, changes are stored prior to being implemented in the hierarchal data structure.

For example, a user may propose a modification to a value associated with the node property. The proposed modification may be stored on a user's computer or in a data repository shared by two or more users accessing the hierarchal-structured data. According to one example embodiment, an application which stores the data organized as node structures may allow users sharing access to the data to propose modifications to data. The proposals may be verified by other users, by a user having a particular authority level, or if a proposal is not objected to within a certain period of time. Prior to being implemented in the hierarchal data structure, the system may store the changes in a queue.

The system determines permissions associated with viewing the non-indexed and non-committed proposed valued for indexed node properties (Operation 506). For example, the node routine may specify that a user who entered a proposed modification to a node property value may view the uncommitted, proposed modification to the node property value and other users may not view the uncommitted, proposed modifications. In addition, or in the alternative, the node routine may specify that an immediate supervisor to the user who initiated the proposed modification to a node property value may view the uncommitted, proposed modifications.

The system executes a query including the indexed node property (Operation 508). Based on permissions associated with uncommitted and non-indexed modifications, the system modifies the query to include a query to non-indexed, uncommitted node property values associated with the indexed node properties (Operation 510). Accordingly, the system is able to return query values associated with non-indexed node property values based on query terms associated with indexed node property values.

Returning to FIG. 2, if the system determines that no node routine exists to identify the non-indexed node property (Operation 220), the system executes the query based on one or more terms associated with indexed node properties and one or more terms associated with non-indexed node properties (Operation 216). In one embodiment, the system executes a first query based on the indexed node properties to generate a sub-set of data from among the entire data set. The system then executes one or more additional queries associated with the non-indexed node properties to identify nodes in the sub-set of data that include values associated with the non-indexed node properties.

In one or more embodiments, the modification of the query based on the indexed node property values reduces the number of queries required to execute a main query. In addition, the modification of the query based on the indexed node property makes use of the hierarchal nature of the data set to identify non-indexed node properties of parent nodes without the need to execute queries on every node in a data set.

In one or more embodiments, prior to analyzing node routines to generate query responses associated with non-indexed query terms (Operation 220, above), the system determines whether the query, including the non-indexed query terms, meets predefined criteria. For example, the system may estimate a time required to execute a query including non-indexed data on each node in a hierarchal data set. If the estimated time is less than a threshold, the system may proceed to execute the query on each node in the data set (skipping Operation 220, above). If, on the other hand, the estimated time exceeds the threshold, the system may refer to a node routine document associated with a node corresponding to an indexed query term to determine whether a routine exists to derive a non-indexed node property, associated with one query term, using an indexed node property, associated with another query term (Operation 220, above).

According to one or more embodiments, a system may identify indexed node properties associated with non-indexed query terms by applying a combination of operations, including, for example, both operations to identify inherited node properties and operations to generate values based on logical or mathematical formulae. For example, a system may receive query terms to execute a query in a hierarchal data set representing restaurants in the world. The leaf nodes represent specific restaurants while other higher-level nodes represent properties including Chain, Country, Vegetarian/Non-Vegetarian, and Zip Code. The system receives a query including query terms "Italian restaurants in California." The system may parse the query to identify "Italian" as a genre of food, "restaurant" as an indexed node type, and "California" as a state-level location. The system determines that neither California nor Italian are associated with indexed properties of a node type "restaurant." The system analyzes a node routine document associated with the node type "restaurant" to identify a logical formula by which an indexed node property "Zip Code" may be obtained by the non-indexed query term "California." In particular, the node routine may direct the system to determine a source zip code from which a query is being requested. If the source zip code is in California, the system may replace the query term "California" with the identified source zip code. The system may add a zip code value 95113 (corresponding to a zip code in California) to the query based on (a) the query originating from a device in the zip code 95113 and (b) the zip code 95113 being indexed and identifying a particular node. In addition, or in the alternative, the system may add the country "United States" to the query based on (a) California being located in the United States and (b) the country United States being indexed and identifying a corresponding node. In addition, the system may identify in the node routine document a node property "genre" associated with the node type "Chain." The node routine document may specify that the node property "genre" of the parent node "Chain" is inherited by the node type "restaurant." The system performs an initial query associated with the terms "95113" and "restaurant" to identify a set of Restaurant-type nodes having a node property "95113." The system then traverses parent nodes of this set of nodes to identify any Chain-type parent nodes having a Genre-type node property "Italian." The system returns as a query response the restaurants included in the subset of nodes including both (a) the Zip Code node property "95113" and (b) a Chain-type parent node with the Genre node property "Italian."

4. Machine-Learning Based Modification of Query

In some examples, one or more elements of the machine learning engine may use a machine learning algorithm to generate recommendations for query terms associated with indexed node properties. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, back-propagation, and/or clustering.

In one or more embodiments, the system may generate, in response to identifying a query that does not include any terms associated with indexed node properties, recommendations for query terms associated with indexed node properties using the machine learning model. The system may train a machine learning model using a data set comprising node properties and values of the node properties. A machine learning model engine may train the machine learning model to identify (a) correlations among values of node properties, and (b) relationships among different node properties in different queries. For example, the machine learning model may be trained to determine that a first query term is frequently used in a query to obtain a particular type of information. The machine learning model may be trained to determine that a second query term may also be used in queries to obtain the particular type of information. Upon detecting a query including the first query term in a hierarchy of nodes that does not include indexed node properties associated with the first query term, the machine learning model may generate a recommendation for the second query term, which is a value associated with an indexed node property. In addition, or in the alternative, a system may modify the query independently of any user input based on the recommendation generated by the machine learning model.

In an embodiment, a set of training data includes datasets and associated labels. The datasets are associated with input variables (e.g., query terms associated with non-indexed node properties) for the target model f. The associated labels are associated with the output variable (e.g., query terms associated with indexed node properties) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a machine learning algorithm can be iterated to learn (a) correlations among values of node properties, and (b) relationships among different node properties in different queries. In an embodiment, a set of training data includes queries including query terms associated with non-indexed node properties. The non-indexed node properties are associated with labels, indicating values, or query terms, associated with indexed node properties. As an example, a set of labels may include a name of each node in a hierarchal data structure of nodes.

5. Example Embodiment

Figure 6:
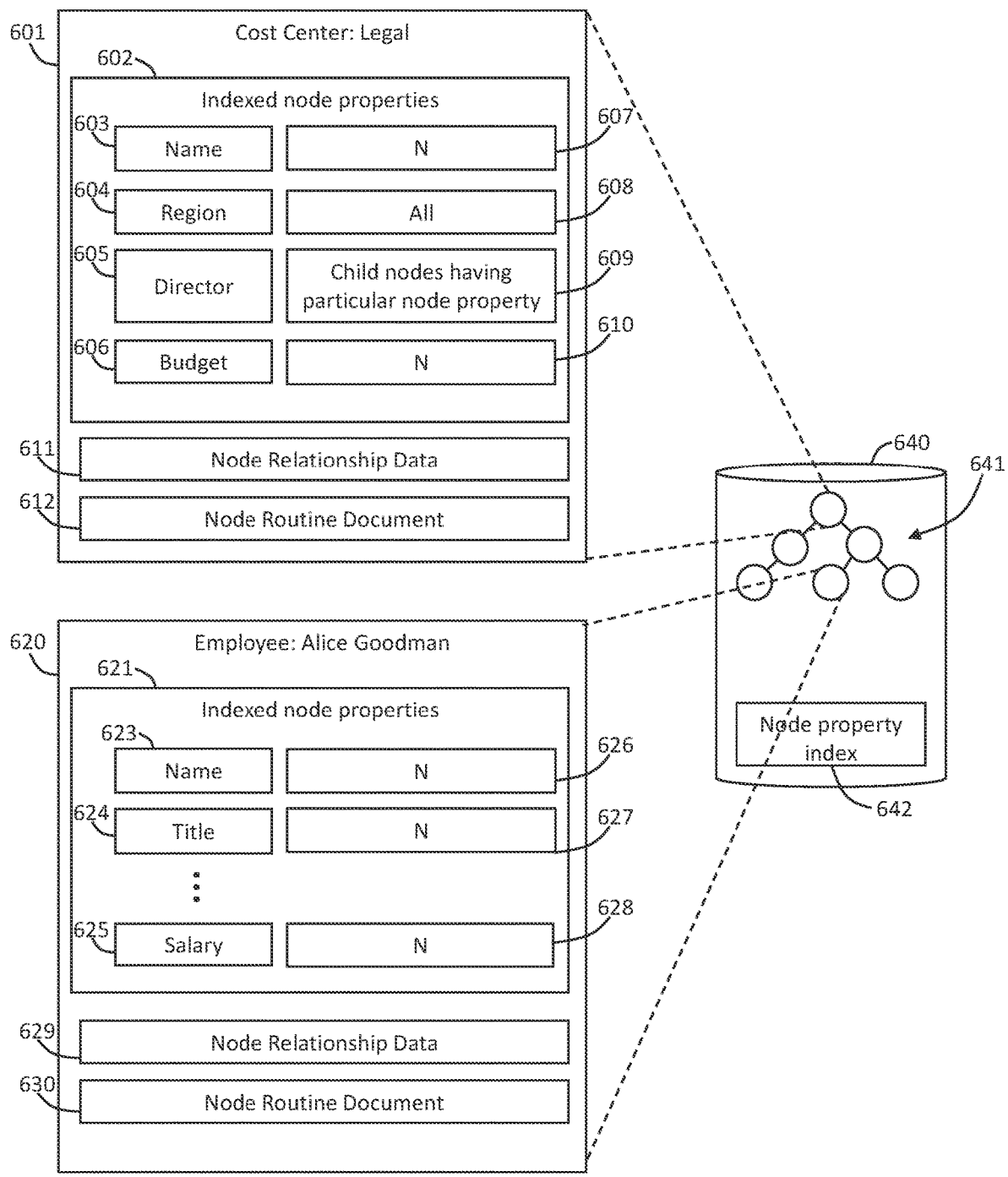
FIG. 6 illustrates an example embodiment of nodes in a node hierarchy.

FIG. 6 illustrates an example embodiment including node properties of two nodes in a hierarchy of nodes in a hierarchal-structured data set 641. A data repository 640 stores a hierarchal data set 641. The hierarchal data set 641 comprises a plurality of nodes representing data organized in a hierarchal structure. The data repository 640 further stores an index 642 of the node properties of the nodes in the hierarchal data set 641. The index 642 includes a list of each node property associated with each node in the hierarchal data set 641. For example, the index 642 may specify the node properties associated with each node type in the hierarchal data set 641. A "CEO" node may include node properties a-f. A "Division Head" node may include node properties a-c, f, and g-i. A "Team Lead" node may include the node properties a-c, g, j, and k. A "Team Member" node may include the node properties a-c, g, and m. The index 642 may store the particular node properties associated with each respective node type.

Node 601 is a node type "cost center" with a node name "Legal." Node 601 includes a set of indexed node properties 602. The indexed node properties include: Name 603, Region 604, Director 605, and Budget 606. The properties 604-606 are represented as fields storing values. For example, a field associated with the node property 603 "Name" may store a value "Legal." A field associated with the node property 604 "Region" may store a value "Eastern Region." A field associated with the node property 605 "Director" may store a value "Jones." A field associated with the node property 606 "Budget" may store a value $500,000.

The node 601 includes data fields 607-610 associated with the respective node properties 603-606 specifying whether the values associated with the node properties 603-606 may be inherited by child nodes. In the example illustrated in FIG. 6, field 607 specifies that a value associated with the node property "Region" (604) is inherited by each child node of the first node 601. For example, child nodes of types "employee," "field office," and "account," may not include an indexed node property "Region." However, these child nodes may inherit the node property value "Eastern Region" from the node property 604 "Region" of their parent node 601.

Field 608 specifies that child nodes having particular node properties inherit the node property "Director" (605). For example, field 608 may specify that employee-type nodes inherit the value associated with the node property "Director" (605), but other types of nodes, such as "field office," and "Account" do not inherit the value associated with the node property "Director." Accordingly, when the system receives a query including terms "Alice Goodman" and "director," the system may refer to the node routine document of a node 620 associated with an employee record for an employee named "Alice Goodman" to identify an inherited node property "director" based on the node 620 "Alice Goodman" being a child node of the node 601 "Cost Center."

Field 609 specifies that no child nodes of the node 601 inherit the node property "Budget" from the node 601. For example, if a system receives a query including query terms "Alice Goodman" and "budget," the system would not identify the node property 606 of parent node 601 as being associated with the child node 620 of the employee type and with a name "Alice Goodman."

The fields 607-609 may be stored as metadata, invisible to an application providing displays of nodes in the hierarchal data structure 641. In addition, or in the alternative, the fields 607-609 may be displayable and editable by an application according to system configuration settings.

The fields 626, 627, and 628 of node 620 specify whether child nodes of node 620 inherit values of the respective node properties 623, 624, and 625.

The nodes 601 and 620 include relationship data 610 and 629, indicating whether the node is a child of one or more parent nodes, a parent to one or more child nodes, and a number of different hierarchies that include instances of the node. According to one embodiment, an application displaying the hierarchal node structure 641 may analyze the relationship data of the nodes in the hierarchal node structure 641 to display parent/child relationships among nodes.

Each node 601 and 620 includes a node routine document 611 and 630, respectively. The node routine documents 611 and 630 include data indicating routines or processes that may be performed by a system to obtain values for node properties that are not indexed to the particular node, but may be derived, inherited, or obtained as a result of an additional query to a particular source. The node routine documents 611 and 630 include: (a) mathematical and logical formulas, (b) node properties that are inherited from parent nodes, and (c) proposed, but uncommitted changes to node property values. The node routine document 611 is illustrated in FIG. 6 as being stored in a data structure associated with the node 601. In one or more embodiments, the node 601 may include a uniform resource locator (URL) or address or pointer to the routine document 611 associated with the node 601.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used in this section of the specification refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
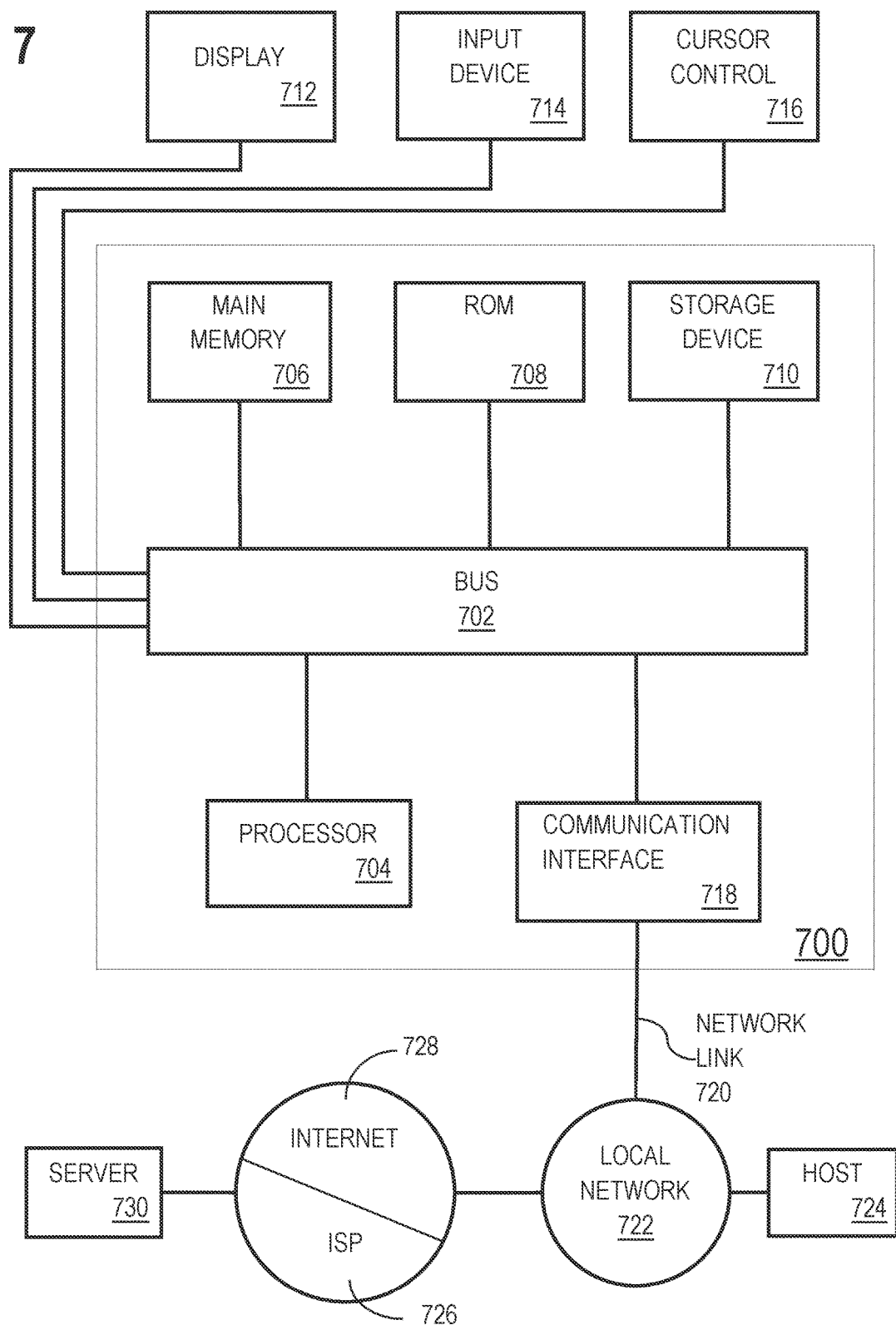
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
receiving a query to identify one or more target nodes in a plurality of nodes corresponding to a respective plurality of entities, each node among the plurality of nodes including corresponding node properties from among a set of node properties,
wherein a first subset of node properties, of the set of node properties, comprises a set of indexed node properties included in a data index,
wherein each particular node property of the indexed node properties, in the data index, is mapped to a corresponding subset of nodes of the plurality of nodes that are associated with the particular node property,
wherein a second subset of the node properties, of the set of node properties, comprises a set of non-indexed node properties that are not included in the data index;
determining that the query includes a set of query terms that correspond to at least a first node among the plurality of nodes;
determining that the set of query terms does not include any query term corresponding to the set of indexed node properties included in the data index;
responsive to determining that the set of query terms does not include any query term corresponding to the set of indexed node properties in the data index:
  accessing information in a document stored in the first node to determine a pre-defined relationship between a first query term included in the set of query terms and an indexed node property;
  determining a second query term comprising the indexed node property from the set of indexed node properties;
  modifying the query to include the second query term comprising the indexed node property from the set of indexed node properties; and
  executing the modified query at least by:
    identifying via the data index a particular subset of nodes, from among the plurality of nodes, mapped to the indexed node property in the data index;
    querying the particular subset of nodes to determine the one or more target nodes; and
    storing or transmitting a response to the query based on the one or more target nodes.

2. The non-transitory computer readable medium of claim 1, wherein modifying the query to include the second query term comprising the indexed node property is further responsive to at least one of: determining an estimated execution time for the query exceeds a threshold value or determining that the query fails a performance criteria.

3. The non-transitory computer readable medium of claim 1, wherein modifying the query comprises:
requesting user input comprising third query term that corresponds to any indexed node property in the data index;
obtaining user input including the third query term; and
creating the modified query using the third query term.

4. The non-transitory computer readable medium of claim 1, wherein the modified query comprises one or more query terms and the second query term.

5. The non-transitory computer readable medium of claim 1, wherein the operations further comprise:
prior to modifying the query: recommending the second query term for modifying the query based on the second query term being associated with the indexed node property of the set of indexed node properties.

6. The non-transitory computer readable medium of claim 1, wherein the query is modified to include the second query term independent of any user input.

7. The non-transitory computer readable medium of claim 6, wherein modifying the query comprises: applying a machine learning model to a third query term of the query to identify a fourth query term comprising the indexed node property.

8. The non-transitory computer readable medium of claim 1, wherein the operations further comprise:
determining that the first query term in the query is associated with a stored proposed modification to a first node property of a first node among the plurality of nodes; and
including a value, based on the proposed modification to the first node, among a set of query results returned by the modified query.

9. The non-transitory computer readable medium of claim 1, wherein the plurality of nodes is organized in a hierarchy based on relationships among the respective plurality of entities.

10. The non-transitory computer readable medium of claim 1,
wherein modifying the query to include the second query term associated with the indexed node property of the set of indexed node properties is further responsive to at least one of:
  determining an estimated execution time for a query exceeds a threshold value or
  determining that the query fails a performance criteria,
wherein the modified query comprises the one or more query terms and the second query term.

11. A method comprising:
receiving a query to identify one or more target nodes in a plurality of nodes corresponding to a respective plurality of entities, each node among the plurality of nodes including corresponding node properties from among a set of node properties,
wherein a first subset of node properties, of the set of node properties, comprises a set of indexed node properties included in a data index,
wherein each particular node property of the indexed node properties, in the data index, is mapped to a corresponding subset of nodes of the plurality of nodes that are associated with the particular node property,
wherein a second subset of the node properties, of the set of node properties, comprises a set of non-indexed node properties that are not included in the data index;
determining that the query includes a set of query terms that correspond to at least a first node among the plurality of nodes;
determining that the set of query terms does not include any query term corresponding to the set of indexed node properties included in the data index;
responsive to determining that the set of query terms does not include any query term corresponding to the set of indexed node properties in the data index:
  accessing information in a document stored in the first node to determine a pre-defined relationship between a first query term included in the set of query terms and an indexed node property;
  determining a second query term comprising the indexed node property from the set of indexed node properties;
  modifying the query to include the second query term comprising the indexed node property from the set of indexed node properties; and
  executing the modified query at least by:
    identifying via the data index a particular subset of nodes, from among the plurality of nodes, mapped to the indexed node property in the data index;

querying the particular subset of nodes to determine the one or more target nodes; and storing or transmitting a response to the query based on the one or more target nodes.

12. The method of claim 11, wherein modifying the query to include the second query term comprising the indexed node property is further responsive to at least one of: determining an estimated execution time for the query exceeds a threshold value or determining that the query fails a performance criteria.

13. The method of claim 11, wherein modifying the query comprises:
    requesting user input comprising third query term that corresponds to any indexed node property in the data index;
    obtaining user input including the third query term; and
    creating the modified query using the third query term.

14. The method of claim 11, wherein the modified query comprises one or more query terms and the second query term.

15. The method of claim 11, further comprising:
    prior to modifying the query: recommending the second query term for modifying the query based on the second query term being associated with the indexed node property of the set of indexed node properties.

16. The method of claim 11, wherein the query is modified to include the second query term independent of any user input.

17. The method of claim 16, wherein modifying the query comprises: applying a machine learning model to a third query term of the query to identify a fourth query term comprising the indexed node property.

18. The method of claim 11, further comprising:
    determining that the first query term in the query is associated with a stored proposed modification to a first node property of the first node among the plurality of nodes; and
    including a value, based on the proposed modification to the first node, among a set of query results returned by the modified query.

19. The method of claim 11, wherein the plurality of nodes is organized in a hierarchy based on relationships among the respective plurality of entities.

20. A system comprising:
    one or more processors; and
    memory storing instructions that, when executed by the one or more processors, cause the system to perform operations comprising:
    receiving a query to identify one or more target nodes in a plurality of nodes corresponding to a respective plurality of entities, each node among the plurality of nodes including corresponding node properties from among a set of node properties,
    wherein a first subset of node properties, of the set of node properties, comprises a set of indexed node properties included in a data index,
    wherein each particular node property of the indexed node properties, in the data index, is mapped to a corresponding subset of nodes of the plurality of nodes that are associated with the particular node property,
    wherein a second subset of the node properties, of the set of node properties, comprises a set of non-indexed node properties that are not included in the data index;
    determining that the query includes a set of query terms that correspond to at least a first node among the plurality of nodes;
    determining that the set of query terms does not include any query term corresponding to the set of indexed node properties included in the data index;
    responsive to determining that the set of query terms does not include any query term corresponding to the set of indexed node properties in the data index:
        accessing information in a document stored in the first node to determine a pre-defined relationship between a first query term included in the set of query terms and an indexed node property;
        determining a second query term comprising the indexed node property from the set of indexed node properties;
        modifying the query to include the second query term comprising the indexed node property from the set of indexed node properties; and
    executing the modified query at least by:
        identifying via the data index a particular subset of nodes, from among the plurality of nodes, mapped to the indexed node property in the data index;
    querying the particular subset of nodes to determine the one or more target nodes; and
    storing or transmitting a response to the query based on the one or more target nodes.

* * * * *